United States Patent
Nieminen et al.

(10) Patent No.: US 9,336,605 B2
(45) Date of Patent: May 10, 2016

(54) MEDICAL IMAGING SYSTEM, COMPUTER-IMPLEMENTED METHOD, AND COMPUTER PROGRAM PRODUCT FOR IDENTIFYING A TREATED REGION IN A MEDICAL IMAGE

(75) Inventors: Heikki Juhani Nieminen, Helsinki (FI); Max Oskar Köhler, Espoo (FI); Marko Tapani Hakkinen, Espoo (FI)

(73) Assignee: Koninklijke Philips N.V., Eindhoven (NL)

( * ) Notice: Subject to any disclaimer, the term of this patent is extended or adjusted under 35 U.S.C. 154(b) by 286 days.

(21) Appl. No.: 13/879,745

(22) PCT Filed: Oct. 13, 2011

(86) PCT No.: PCT/IB2011/054521
§ 371 (c)(1),
(2), (4) Date: Apr. 16, 2013

(87) PCT Pub. No.: WO2012/052885
PCT Pub. Date: Apr. 26, 2012

(65) Prior Publication Data
US 2013/0208961 A1    Aug. 15, 2013

(30) Foreign Application Priority Data
Oct. 19, 2010    (EP) .................................... 10187983

(51) Int. Cl.
*G06K 9/00* (2006.01)
*G06T 7/00* (2006.01)

(52) U.S. Cl.
CPC ............. *G06T 7/0079* (2013.01); *G06T 7/0081* (2013.01); *G06T 2207/10132* (2013.01); *G06T 2207/30004* (2013.01)

(58) Field of Classification Search
USPC .................................................. 382/128, 173
See application file for complete search history.

(56) References Cited

U.S. PATENT DOCUMENTS

| | | | |
|---|---|---|---|
| 2005/0019267 A1* | 1/2005 | Brechbiel et al. .......... | 424/9.322 |
| 2009/0196480 A1 | 8/2009 | Nields | |

(Continued)

FOREIGN PATENT DOCUMENTS

| | | |
|---|---|---|
| EP | 2194486 A1 | 6/2010 |
| WO | 2010018476 A2 | 2/2010 |
| WO | 2010018477 A2 | 2/2010 |

OTHER PUBLICATIONS

Castaneda, B. et al "Measurement of Thermally Ablated Lesions in Sonoelastographic Images using Level Set Methods", Proceedings of the SPIE—The International Society for Opticla Engineering, vol. 6920, Mar. 6, 2008, pp. 692018-1.*

(Continued)

*Primary Examiner* — Gregory F Cunningham

(57) ABSTRACT

A medical imaging system (900, 1000, 1100, 1200) for acquiring medical image data (930), the medical imaging system comprising: a tissue treating system (910, 1080, 1180, 1190, 1280, 1290) for treating a target volume (908); a computer system (918) comprising a processor (922), wherein the computer system is adapted for controlling the medical imaging system; and a memory (928) containing machine readable instructions (954, 956, 958, 962, 964, 966, 968, 970, 972, 974). Execution of the instructions cause the processor to: acquire (100, 200, 308) medical image data; reconstruct (102, 202, 310) a medical image (932) using the medical image data; receive (104, 204, 312) an image segmentation seed (600, 934) derived from a treatment plan (936), and identify (106, 210, 314) a treated volume (400, 700, 800) in the medical image by segmenting the medical image in accordance with the image segmentation seed.

21 Claims, 10 Drawing Sheets

(56) References Cited

U.S. PATENT DOCUMENTS

2010/0030208 A1 2/2010 Manley
2010/0063496 A1 3/2010 Trovato

OTHER PUBLICATIONS

Marquez, S. et al "Characterization of Ultrasound Images of HIFU-Induced Lesions by Extraction of its Morphological Properties", Electrical Ingineering Computing Science and Automatic Control, Sep. 8, 2010, pp. 230-235.

Ali Ziadloo et al "Real-Time 3D Image-Guided HIFU Therapy", Engineering in Medicine and Biology Society, Aug. 20, 2008, pp. 4459-4462.

Faqi Li et al Research on Thermal Dosage for High Intensity Focused Ultrasound in Bovine Liver based on the Magnetic Resonance Thermometry, Biomedical Engineering and Informatics, Oct. 2009, pp. 1-3.

Amin, Viren et al Therapy Planning and Monitoring of Tissue Ablation by High Intensity Focused Ultrasound (HIFU) using Imaging and Simulation, 30th Annual International IEEE EMBS Conference, Aug. 2008.

McCreedy, Evan S. et al "Radio Frequency Ablation Registration, Segmentation, and Fusion Tool", IEEE Trans. Inf. Technol Biomed. Jul. 2006, vol. 10, No. 3.

Sato, Koichiro et al "A New Function for Accurate MR Guided Microwave Ablation using Vertically Opened 0.5-T MR System", IEEE, 2004, pp. 277-279.

* cited by examiner

MEDICAL IMAGING SYSTEM, COMPUTER-IMPLEMENTED METHOD, AND COMPUTER PROGRAM PRODUCT FOR IDENTIFYING A TREATED REGION IN A MEDICAL IMAGE

CROSS-REFERENCE TO PRIOR APPLICATIONS

This application is the U.S. National Phase application under 35 U.S.C. §371 of International Application No. PCT/IB2011/054521, filed on Oct. 13, 2011, which claims the benefit of European Patent Application No. 10187983.1, filed on Oct. 19, 2010. These applications are hereby incorporated by reference herein.

TECHNICAL FIELD

The invention relates to the identification of a treated volume in a medical image.

BACKGROUND OF THE INVENTION

Various techniques may be used to heat tissue to perform therapy or ablate tissue. In particular, high intensity focused ultrasound is used for sonicating or treating a region of tissue within a subject with high intensity focused ultrasound. The high intensity focused ultrasound can be used for heating a region within the subject, it can be used for rupturing tiny capsules of a drug and activating the drug, it can be used for ablating tissue, and at higher powers cavitation can be used to destroy regions within the subject. High intensity focused ultrasound is focused into a region of the subject using a transducer. Very often the transducers have multiple elements and by controlling the phase and/or amplitude of the individual elements the focus of the ultrasound within the subject can be adjusted to a certain degree.

When a region of a subject is sonicated, detailed information about the anatomy or internal structure of the subject is beneficial. As a result sonication of the subject is typically guided using a medical imaging modality. An example of such a medical imaging modality is magnetic resonance imaging.

SUMMARY OF THE INVENTION

The invention provides for a medical imaging system, a computer-implemented method, and a computer program product in the independent claims. Embodiments are given in the dependent claims.

It may be beneficial to identify the region which has been treated with a tissue treating system using medical imaging. By way of example, particular emphasis is given to the case of high intensity focused ultrasound (HIFU) guided by magnetic resonance imaging (MRI). However, embodiments of the invention are also applicable to other tissue treating and imaging modalities.

When high intensity focused ultrasound (HIFU) is guided by magnetic resonance imaging (MRI) contrast agents may be administered to the subject after therapy to evaluate the treatment outcome. E.g. gadolinium based contrast agents, such as Gd-DTPA, gadodiamide, or gadoteridol, affect the T1 relaxation time and may be used to identify non-perfused volumes within the subject. After therapy the blood supply to a treated or sonicated region may be occluded. It may be possible to identify the treated or non-perfused tissue region due to treatment by making contrast-enhanced T1 weighted magnetic resonance images.

For local drug or gene delivery therapy, small known amounts of contrast agent may be encapsulated within the same capsule (e.g. liposome) as the drug or gene. At a certain temperature, pressure, or similar the capsule is ruptured thus releasing drug or gene as well as the encapsulated contrast agent. In the case of MR guided HIFU the change in MR signal intensity in the heated or treated region can thus be attributed to release of contrast agent, which in turn indicates a successful release of the drug or gene. The intensity change correlates with the amount of drug released, and identifying the region with altered contrast equals identifying the region where the drug (e.g. a chemotherapy agent) has been successfully deposited in the tissue.

Embodiments of the invention may be able to segment medical imagery by detecting the contrast change due to local co-release of contrast agent with drug or gene from capsule. In some embodiments a region of the medical image may be defined where automated segmentation is performed on an area where the drug or contrast agent has indeed been released. This area and/or volume may change in real time and feedback on where release has occurred might enable adapting the therapy according to the therapeutic response (i.e. the drug release). Such embodiments may provide more effective and accurate therapy.

Currently, there are various methods developed to segment tissues in magnetic resonance (MR) images. However, there is a need for a method of segmenting HIFU-ablated tissue from the surrounding tissue in magnetic resonance images. Currently the "Gold Standard" is contouring manually the ablation edges slice-by-slice from contrast-enhanced MR images. However, these prior techniques are time-consuming and are mainly manual. Embodiments of the invention may address this problem by providing for a technique for fast, easy-to-use and accurate volume estimation and visualization of HIFU-ablated tissue from segmented magnetic resonance (MR) images. Embodiments are also applicable to other tissue treating and imaging modalities.

Conventional techniques to segment HIFU-ablated from the surrounding tissues in MR image sets are mainly manual and time-consuming. Embodiments of the invention may enable automatic and/or semi-automatic, fast, easy-to-use, and accurate volume estimation and visualization of HIFU-ablated tissue from segmented magnetic resonance (MR) images.

Fast, accurate and easy-to-use segmentation of HIFU-ablated tissue from surrounding tissues in contrast-enhanced images by exploiting spatially planned or realized treating or heating locations as the seed points for the automatic/semi-automatic segmentation procedure and optionally using a priori information about target volume or treating shape or volume adapted with observed treating as a method to prevent segmentation from growing to non-ablated or non-treated areas.

A computer-readable storage medium as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device. Example of computer-readable storage media include, but are not limited to: a floppy disk, a magnetic hard disk drive, a solid state hard disk, flash memory, a USB thumb drive, Random Access Memory (RAM) memory, Read Only Memory (ROM) memory, an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example a data may be retrieved over a modem, over the internet, or over a local area network.

Computer memory is an example of a computer-readable storage medium. Computer memory is any memory which is directly accessible to a processor. Examples of computer memory include, but are not limited to: RAM memory, registers, and register files.

Computer storage is an example of a computer-readable storage medium. Computer storage is any non-volatile computer-readable storage medium. Examples of computer storage include, but are not limited to: a hard disk drive, a USB thumb drive, a floppy drive, a smart card, a DVD, a CD-ROM, and a solid state hard drive. In some embodiments computer storage may also be computer memory or vice versa.

A 'computer system' as used herein refers to any device comprising a processor. A processor is an electronic component which is able to execute a program or machine executable instruction. References to the computing device comprising "a processor" should be interpreted as possibly containing more than one processor. The term computing device should also be interpreted to possibly refer to a collection or network of computing devices each comprising a processor. Many programs have their instructions performed by multiple processors that may be within the same computing device or which may even distributed across multiple computing device.

A 'user interface' as used herein is an interface which allows a user or operator to interact with a computer or computer system. A user interface may provide information or data to the operator and/or receive information or data from the operator. The display of data or information on a display or a graphical user interface is an example of providing information to an operator. The receiving of data through a keyboard, mouse, trackball, touchpad, pointing stick, graphics tablet, joystick, gamepad, webcam, headset, gear sticks, steering wheel, pedals, wired glove, dance pad, remote control, and accelerometer are all examples of receiving information or data from an operator.

'Medical image data' is defined herein as two or three dimensional data that has been acquired using a medical imaging system. A medical imaging system is defined herein as a apparatus adapted for acquiring information about the physical structure of a patient and construct sets of two dimensional or three dimensional medical image data. Medical image data can be used to construct visualizations which are useful for diagnosis by a physician. This visualization can be performed using a computer. A medical image as used herein encompasses an image rendered, at least partially, using medical image data.

Magnetic Resonance (MR) data is an example of medical image data and is defined herein as being the recorded measurements of radio frequency signals emitted by atomic spins by the antenna of a Magnetic resonance apparatus during a magnetic resonance imaging scan. A Magnetic Resonance Imaging (MRI) image is defined herein as being the reconstructed two or three dimensional visualization of anatomic data contained within the magnetic resonance imaging data. This visualization can be performed using a computer.

As used herein an 'ultrasound window' encompasses a window which is able to transmit ultrasonic waves or energy. Typically a thin film or membrane is used as an ultrasound window. The ultrasound window may for example be made of a thin membrane of BoPET (Biaxially-oriented polyethylene terephthalate).

As used here a 'tissue treating system' encompasses a system or apparatus for treating a local volume of tissue in a controlled manner. As used here it is understood that 'treating a local volume of tissue' is the adding or removing of thermal energy into or from a local volume. Examples of tissue treating systems include, but are not limited to: a laser, a high intensity focused ultrasound system, a microwave treating system, and a radio-frequency treating system, and a cryo-ablation system. A tissue treating system may also be a tissue heating system for heating a local volume of tissue in a controlled manner. A tissue treating system may also be a tissue cooling system for cooling a local volume of tissue in a controlled manner. The local volume of tissue treated in a controlled manner by a tissue treating system may be referred to as a 'treated volume' or a 'thermally treated volume.' Likewise the 'tissue treating system' may also be referred to as a 'thermal tissue treating system.'

In one aspect the invention provides for a medical imaging system for acquiring medical image data. The medical image data is acquired from an imaging volume. The medical imaging system comprises a tissue treating system for treating a target volume of a subject. The medical image data may be acquired from a subject or a portion of a subject within the imaging volume. The medical imaging system further comprises a computer system comprising a processor. The computer system is understood to be an equivalent of a control system. The computer system may also be a single computer system or a collection of connected computer systems. The processor may also be a single processor or it may be multiple processors. Multiple processors may be within a single computer system or the processors may be distributed through a variety or a collection of different computer systems. The computer system is adapted for controlling the medical imaging system. The computer system may be connected or networked to various components of the medical imaging system and may be able to send and receive commands from these components. In this way the computer system may be able to control the medical imaging system.

The medical imaging system further comprises a memory containing machine-readable instructions for execution by the processor. Execution of the instructions causes the processor to acquire medical imaging data by controlling the medical imaging system. Execution of the instructions further causes the processor to reconstruct a medical image using the medical image data. The instructions may contain code which is used to reconstruct the medical data into a medical image. The type of medical imaging system may determine how the medical image data is acquired and also how the image is reconstructed.

Execution of the instructions further cause the processor to receive an image segmentation seed derived from a treatment plan. The treatment plan is descriptive of the target volume. As used herein an image segmentation seed is data which is descriptive or identifies a region of an image. For instance an image segmentation seed in some embodiments may be a single location or multiple locations which are known to be within a particular region of interest within an image.

In another embodiment the treated volume is a non-perfused volume.

In another embodiment the treated volume is a volume of altered image contrast.

In other embodiments an image segmentation seed may be a portion of anatomy which is identified in the subject. In other embodiments the image segmentation seed may be a fit of a model to a region of anatomy identified in the medical image. As used herein a treatment plan is a set of instructions or outline of instructions for performing a therapeutic operation on a subject. The treatment plan may in some embodiments be an outline of the target volume and details on which regions should be treated. In other embodiments the treatment plan is or may be a set of instructions for operating the tissue treating system. Execution of the instructions further cause the processor to identify a treated volume in the medical image by segmenting the medical image in accordance with the image segmentation seed. By performing the segmentation of the medical image using the image segmentation seed a treated volume is identified within the medical image.

This embodiment may be useful because the treated volume may identify the actual volume of the subject that was treated using the tissue treating system. This may be used for evaluating a therapy when a target volume is specified to be treated in a particular treatment plan. In other words the volume may be used to evaluate the effectiveness of a therapy using the tissue treating system.

In another embodiment the instructions cause the processor to identify the treated volume in the medical image by thresholding the medical image. That is above or below a particular threshold the medical image is turned into a black and white image. The instructions further cause the processor to floodfill the thresholded medical image in accordance with the image segmentation seed. For instance the image segmentation seed may contain a location known to have been treated using the tissue treating system. By floodfilling the thresholded medical image using this particular image seed point the treated volume may be able to be identified. Execution of the instructions further causes the processor to identify the treated volume in the medical image by identifying the treated volume in accordance with the floodfill in the thresholded medical image. For instance the region which was floodfilled in the image may be in some embodiments identified as being the treated volume.

In another embodiment the treated volume is identified in the medical image by identifying contour lines of the threshold in the medical image. This is an alternative to performing a floodfill.

In the embodiments described herein reference is made to a medical image or medical image data. The medical image or the medical image data may refer to multiple medical images and may also refer to a volume. For instance when magnetic resonance imaging data is acquired the data may be reconstructed into multiple slices which may be used to represent a volume. It is understood herein that the application of the embodiments of the invention may apply to multiple images which also represent a volume. Steps which identify the treated volume may refer to identifying the treated volume within multiple images which are used to represent a three-dimensional structure.

In another embodiment the segmentation of the medical image is limited to a segmentation region. The segmentation region is determined in accordance with the target volume. The target volume is described by the treatment plan. The segmentation region in some embodiments may be a region which surrounds or is identical with the target volume. For instance the target volume may be specified as having a particular volume. An offset may be used to define a volume which is slightly larger than the target volume. This slightly larger region may be the segmentation region and may be used as a limit for segmenting the image. It may not be known if the tissue treating system perfectly heats the target volume and if the treated volume is identical with the target volume or not. However, in most circumstances the treated volume will be identical to the target volume within a certain degree of error. By defining a segmentation region which is based on the target volume this margin of error can be quantified and used to limit the segmentation. This is advantageous because it reduces the chances of an erroneous segmentation. It also simplifies the segmentation process as areas outside of the segmentation region may be ignored or not considered in the segmentation.

In another embodiment the instructions further cause the processor to perform the step of calculating an expected treated volume in accordance with the treatment plan. The segmentation of the medical image is limited to the expected treated volume. In this embodiment the processor may perform the step of calculating the expected treated volume using a model. For instance there is a target volume which is essentially specified or described by the treatment plan. A model may be used to determine if the treatment plan is followed what region of the subject will actually be treated. In some embodiments this may be refined further by using the medical image data. For instance the medical image data could be segmented and various regions of anatomy could be identified. Once the regions of anatomy are identified then this could be fit to a thermal model of a subject or a thermal model could be deformed to fit the anatomy identified in the medical imaging data or image. The use of this thermal model could then be used to calculate the expected treated volume.

In another embodiment the instructions further cause the processor to derive the image segmentation seed from the treatment plan. In this embodiment information is taken from the treatment plan and used to derive the image segmentation seed. This may be performed in various ways for instance having the treatment plan may specify regions which are intended to be treated above a certain temperature for a certain period of time. These volumes or regions may be used to provide the image segmentation seed. If individual points are treated, for instance if high-intensity focused ultrasound is used and individual sonication points are specified, one or more of the sonication points or treating points may be used to provide the image segmentation seed.

In another embodiment the instructions further cause the processor to calculate a thermal dosage map in accordance with the treatment plan. A thermal dosage map as used herein encompasses an image or data file which specifies or indicates the temperature of anatomical regions or volumes. In this embodiment data or information specified in the treatment plan is used to calculate the thermal dosage. For instance the target volume to be treated may be specified by the treatment plan. However, various regions within the target volume may be treated more or less than other regions. The image segmentation seed may be derived by selecting at least one region with a thermal dose above a predetermined threshold from the thermal dosage map. The thermal dosage map may for instance be calculated using a thermal model, such as a finite difference model. Anatomical regions and their thermal properties may be identified in the treatment plan. The heating or cooling of different anatomical regions may also be specified in the treatment plan and may be used as an input to the thermal model.

In another embodiment the image segmentation seed is selected from at least one region in the target volume by treating points specified in the treatment plan. For instance in high-intensity focused ultrasound there may be individual points or locations which are specified to be heated in the treatment plan. These treating points may be used as image segmentation seed or seeds.

In another embodiment the instructions further cause the processor to acquire planning medical image data using the medical imaging system. The planning medical image data may be medical image data which is used to plan a therapy or to register the anatomy of the subject to the treatment plan. Execution of the instructions further causes the processor to reconstruct a planning medical image using the planning medical image data. Execution of the instructions further cause the processor to generate control signals for controlling the tissue treating system in accordance with the planning medical image and the treatment plan. The control signals are the actual signals which the processor may send or transmit to the tissue treating system. For instance the treatment plan may contain generalized instructions or a set of conditional instructions which detail how to create the control signals. The planning medical image may contain anatomical data which can be used to register the treatment plan to the medical image and therefore to the actual anatomy of the subject. Execution of the instructions further cause the processor to send the control signals to the tissue treating system which results in the tissue treating system treating the target volume.

In another embodiment the tissue treating system is a high-intensity focused ultrasound system. In this embodiment an ultrasound transducer is used to focus high-intensity ultrasound into a sonication volume which either heats and/or destroys tissue within the sonication volume.

In another embodiment the tissue treating system is a radio-frequency tissue treating system. In this embodiment a radio-frequency antenna is used to heat the target volume of the subject. The radio-frequency tissue treating system may comprise a radio-frequency power supply and a radio-frequency antenna for treating the target volume. In some embodiment the radio-frequency antenna may comprise multiple elements and the power supply may be able to control the amplitude and/or phase of electrical power delivered to each element of the antenna.

In another embodiment the tissue treating system is a microwave applicator. In this embodiment a microwave power supply is used in conjunction with the microwave applicator to locally heat a region or the target volume of the subject.

In another embodiment the tissue treating system is a laser. In this embodiment high-intensity laser light is focused onto the target volume. The tissue may be treated and/or ablated using the laser.

In another embodiment the medical imaging system further comprises an electrographic ultrasound system. An electrographic ultrasound system as used herein comprises an ultrasonic transducer and power supply which are used to produce vibrations in a vibration region of the subject. The electrographic ultrasound system may for example, but is not limited to, be used for performing ultrasound elastography or magnetic resonance imaging elastography. The target volume may be identical with the vibration region or it may be a subset of a vibration region. The electrographic ultrasound system is used to produce vibrations in the subject which may be used to identify changes in the elastic properties of tissue within the subject. For instance tissues which are less elastic will move less and/or cause less blurring in medical images. The combination of an electrographic ultrasound system with conventional ultrasonic imaging and magnetic resonance imaging is well known. The instructions further cause the processor to activate the electrographic ultrasound system when acquiring the medical image data. The medical image is an electrographic medical image. An electrographic medical image as used herein refers to a medical image which is acquired when an electrographic ultrasound system was used. The electrographic medical image may have been processed to evaluate or determine the elastic properties of tissue within the subject.

In another embodiment the medical imaging system is a magnetic resonance imaging system. The instructions cause the processor to acquire the medical imaging data a predetermined time after the subject is injected with a magnetic resonance contrast agent. For instance after the subject has been injected with a gadolinium-based contrast agent various regions of the subject will contain the gadolinium contrast agent. However, regions which have been treated above a particular threshold may no longer receive an adequate blood supply. In this case these non-perfused regions may contain less of the contrast agent. In this case the T1 relaxation time will not be affected by the gadolinium-based contrast agent. In this embodiment the treated volume will be readily identified in the image because the T1 relaxation time is not affected. For instance if a T1 weighted magnetic resonance image is created and the seed is chosen from the treatment plan a floodfill may be used to identify the treated volume.

In another embodiment the instructions further cause the processor to acquire pre-contrast-agent medical image data. The instructions further cause the processor to reconstruct a pre-contrast-agent medical image. The instructions cause the processor to identify the treated volume in the magnetic resonance image in accordance with the image segmentation seed and the pre-contrast-agent medical image. For instance, the pre-contrast-agent medical image may be subtracted or added to the medical image. This in combination with the use of the image segmentation seed may make it easier to identify the ablated or treated volume.

In another embodiment the medical imaging system is an ultrasound imaging system. An ultrasonic transducer is used to produce ultrasound which is used to generate the medical image data. This medical image data is then reconstructed into a medical image. The treating volume may for instance by identified by using contrast agents, e.g. Sonovue, which identify regions that have been treated.

In another embodiment the medical imaging system is a computer tomography system. Computer tomography x-rays are used to construct three-dimensional images of the subject or are used to construct two dimensional slices of volumes of the subject. The computer tomography may be used with a contrast agent to identify the treated region additionally and electrographic ultrasound system may be used in conjunction with the computer tomography system to also identify the region that is treated because of a change in the elastic properties of the treated region.

In another embodiment the medical imaging system may be a magnetic resonance imaging system. The use of contrast agents in magnetic resonance imaging to identify non-perfused volumes is known. Additionally an electrographic ultrasound system may also be used with magnetic resonance imaging.

In another aspect the invention provides for a computer-implemented method of identifying a treated volume in a medical image. The computer-implemented method may be implemented by a computer for controlling a medical imaging system according to an embodiment of the invention or it may be performed by a computer system which receives data from a medical imaging system according to an embodiment of the invention. The method comprises receiving medical image data. The method further comprises reconstructing a medical image using the medical image data. The method further comprises receiving an image segmentation seed derived from a treatment plan. The treatment plan is descriptive of a target volume. The method further comprises identifying a treated volume in the medical image by segmenting the magnetic resonance image in accordance with the image segmentation seed.

In another aspect the invention provides for a computer program product comprising machine executable instructions for execution by a processor. The computer program product may for instance be stored on a computer-readable storage medium. Execution of the instructions causes the processor to receive medical image data. In some embodiments the computer program product may contain instructions such that the step of receiving the medical image data is performed by acquiring medical image data by controlling a medical imaging system according to an embodiment of the invention. Execution of the instructions further causes the processor to reconstruct a medical image using the medical image data.

Execution of the instructions further cause the processor to receive an image segmentation seed derived from a treatment plan. The treatment plan is descriptive of a target volume. Execution of the instructions further cause the processor to identify a treated volume in the medical image by segmenting the medical image in accordance with the image segmentation seed. In some embodiments the segmentation seed is derived from the treatment plan manually or by a different computer program product. In some embodiments the computer program product comprises code for deriving the image segmentation seed.

BRIEF DESCRIPTION OF THE DRAWINGS

In the following preferred embodiments of the invention will be described, by way of example only, and with reference to the drawings in which.

DETAILED DESCRIPTION OF THE EMBODIMENTS

Like numbered elements in these figures are either equivalent elements or perform the same function. Elements which have been discussed previously will not necessarily be discussed in later figures if the function is equivalent.

Figure 1:
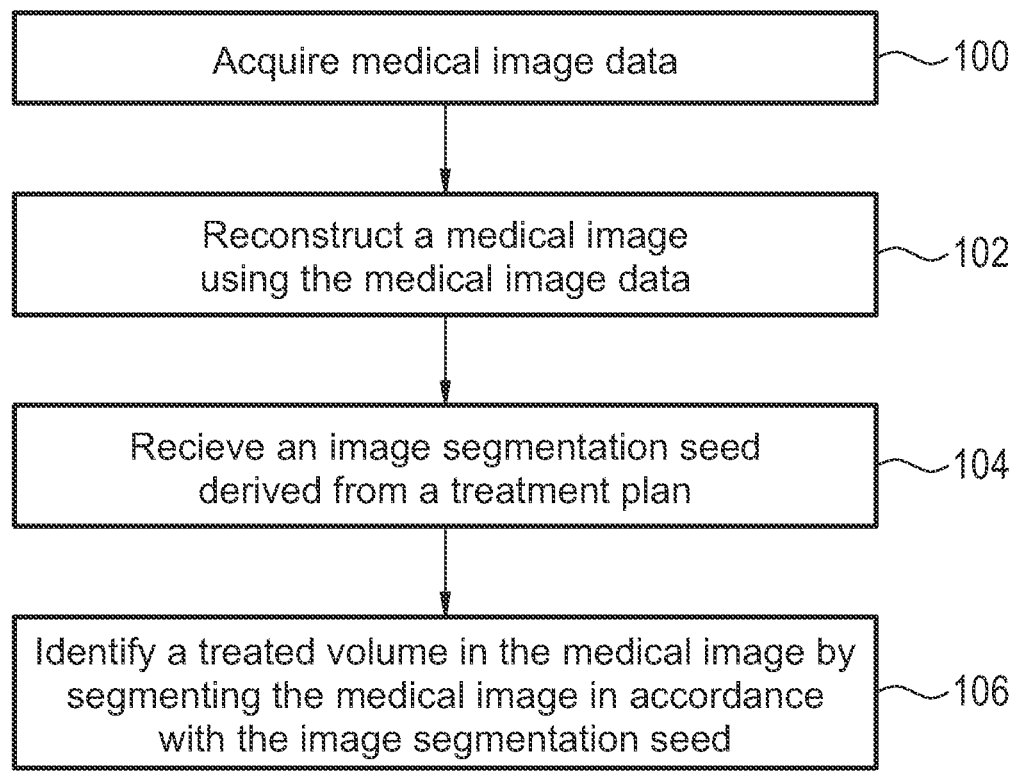
FIG. 1 shows a flow diagram which illustrates an embodiment of a method according to the invention.

FIG. 1 shows a flow diagram which illustrates an embodiment of a method according to the invention. In step 100 medical image data is acquired. In step 102 a medical image is reconstructed using the medical image data. In some instances the reconstruction of a medical image may refer to the reconstruction of multiple medical images. For instance when magnetic resonance data is acquired this magnetic resonance data may be reconstructed into multiple images or slices which are used to represent a three-dimensional volume. In step 104 an image segmentation seed is received. The image segmentation seed is derived from a treatment plan. In step 106 a treated volume is identified in the medical image by segmenting the medical image in accordance with the image segmentation seed. The method illustrated in this Fig. may be beneficial because the medical image data may be acquired using the same medical imaging system which is used to guide a tissue treating system. This means that the tissue treating system and the image segmentation seed may have the same registration.

Figure 2:
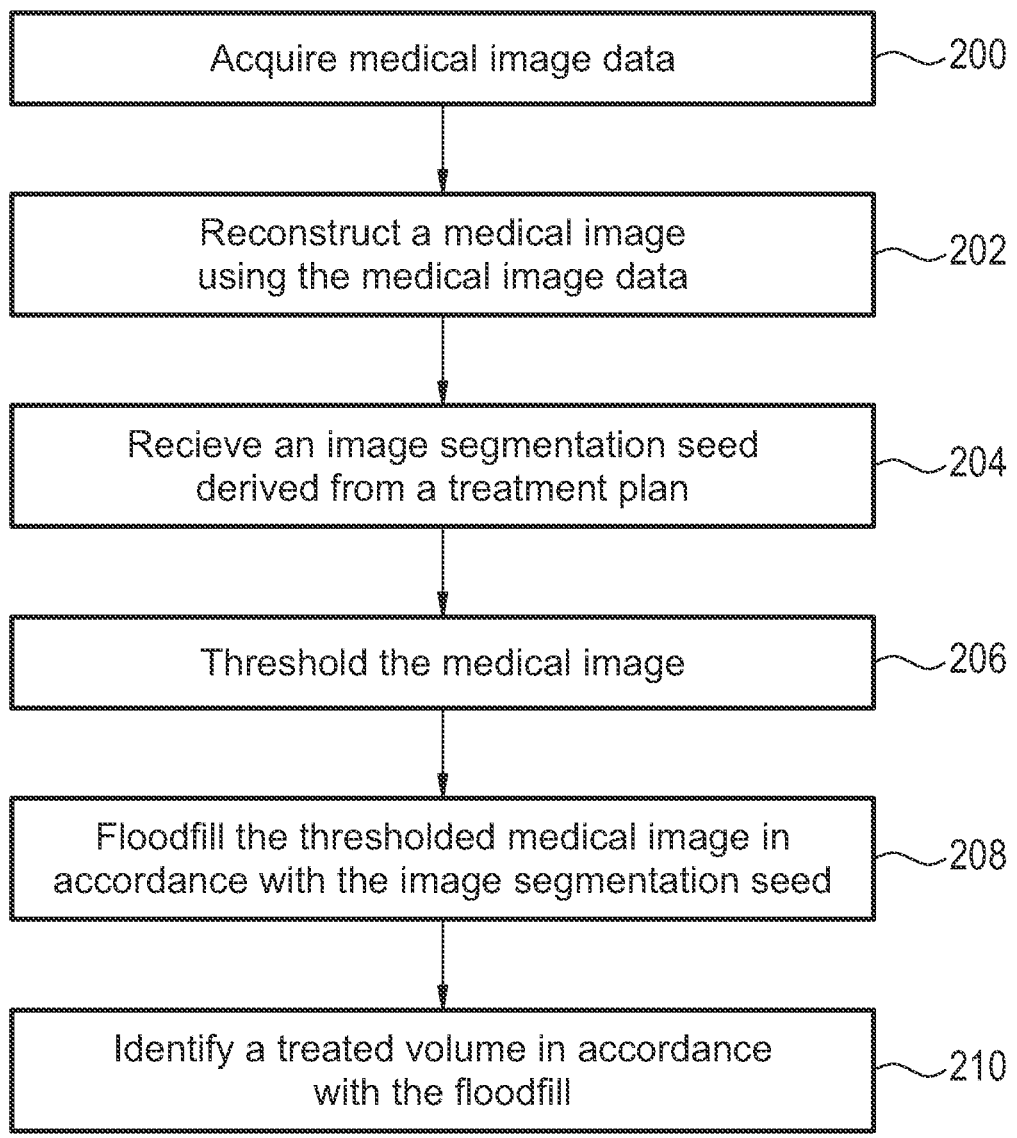
FIG. 2 shows a flow diagram which illustrates a further embodiment of a method according to the invention.

FIG. 2 shows a flow diagram which illustrates a method according to a further embodiment of the invention. In step 200 medical image data is acquired. In step 202 a medical image is reconstructed using the medical image data. In step 204 an image segmentation seed is received. The image segmentation seed is derived from a treatment plan. In step 206 the medical image is thresholded. That is a threshold is chosen and the medical image is changed into essentially a black and white image. In step 208 the thresholded medical image is floodfilled in accordance and the image segmentation seed. For instance the image segmentation seed may identify a point or points within the thresholded medical image which are definitely within the treated volume. In step 210 a treated volume is identified in the image in accordance with the floodfill. For instance the floodfill may be identified as being identical with the treated volume in some embodiments.

Figure 3:
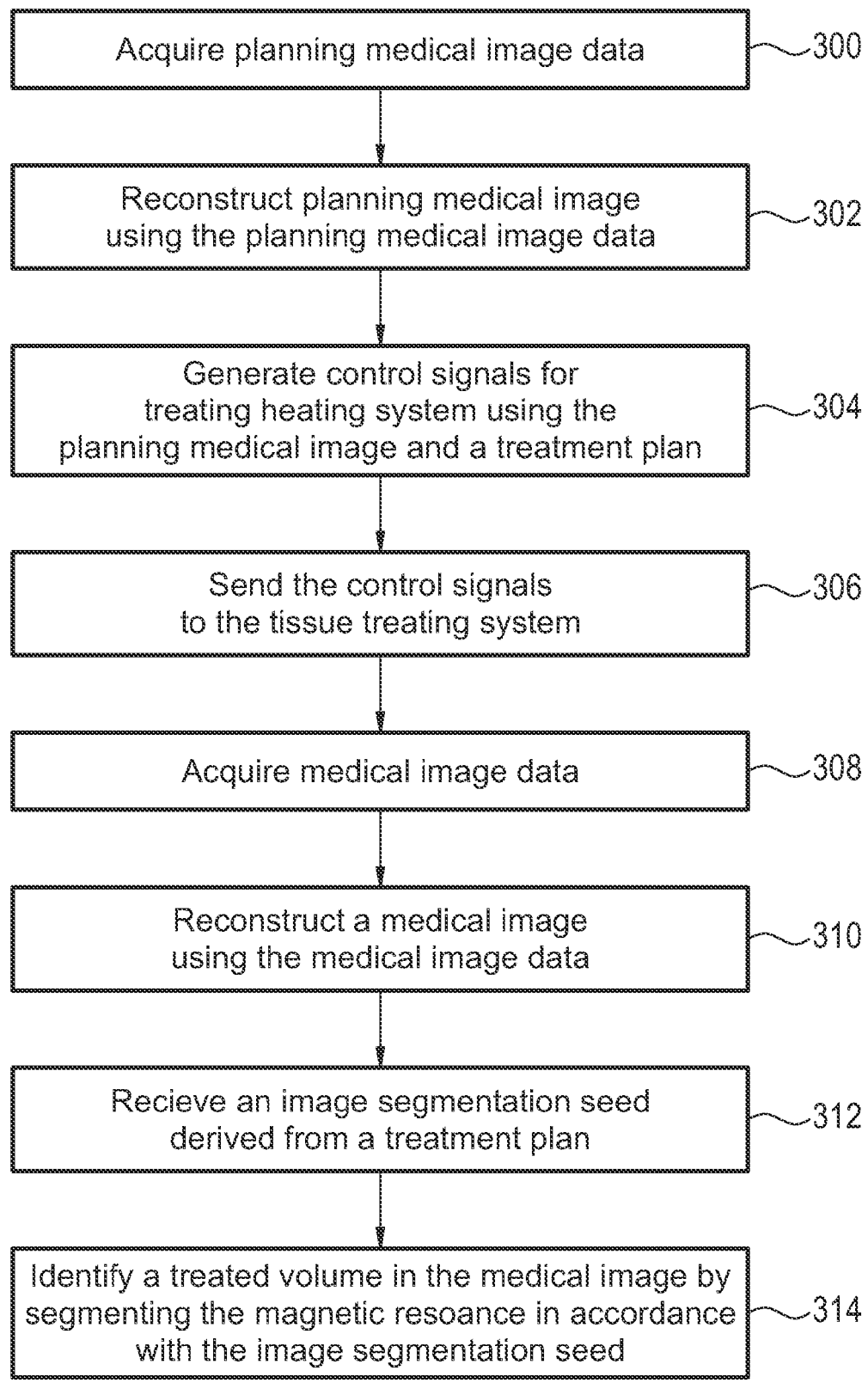
FIG. 3 shows a flow diagram which illustrates a further embodiment of a method according to the invention.

FIG. 3 shows a flow diagram which illustrates a method according to a further embodiment of the invention. In step 300 planning medical image data is acquired. In step 302 a planning medical image is reconstructed using the planning medical image data. In step 304 control signals are generated for the tissue treating system using the planning medical image and a treatment plan. In step 306 control signals are sent to the tissue treating system. The act of sending the control signals to the tissue treating system causes the tissue treating system to execute the control signals and to heat the target volume. In step 308 medical image data is acquired. In step 310 a medical image is reconstructed using the medical image data. In step 312 an image segmentation seed is received. The image segmentation seed is derived from the treatment plan. Essentially the same treatment plan was used to generate control signals for controlling the tissue treating system and also for deriving the image segmentation seed. In step 314 a treating volume is identified in the medical image by segmenting the magnetic resonance image in accordance with the image segmentation seed.

Figure 4:
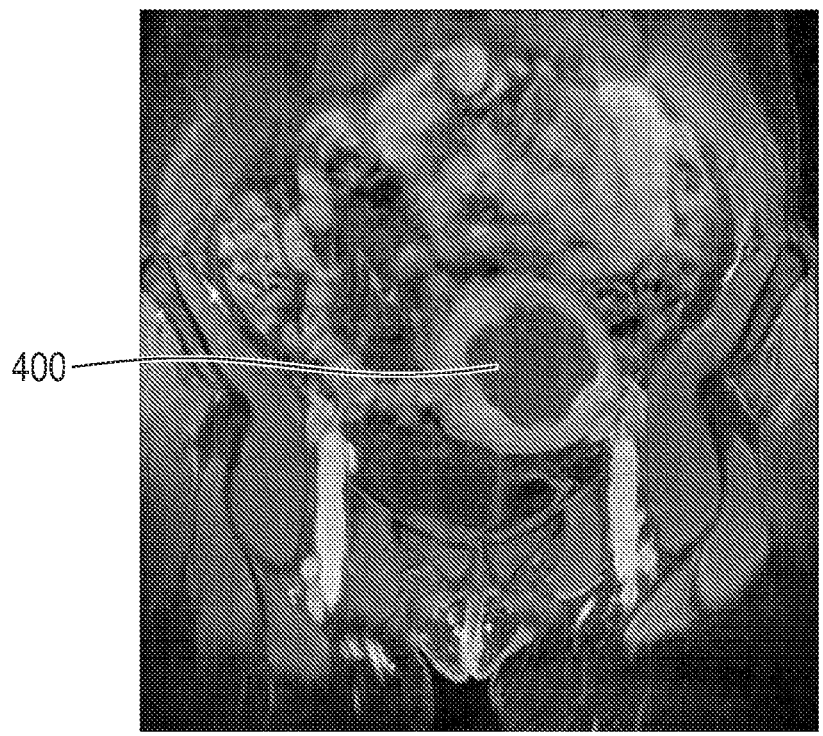
FIG. 4 shows a magnetic resonance image.

FIG. 4 shows a magnetic resonance image, the magnetic resonance image essentially shows a coronal cross-sectional view of a uterine fibroid 400 which has been treated with high-intensity focused ultrasound. The magnetic resonance image was acquired after administering a gadolinium-based T1 relaxation agent. The region 400 may be considered to be a treated volume.

The segmentation of the image shown in FIG. 4 can be divided into three different stages: 1. Segmentation into foreground and background, 2. Optional manual adjustments of the segmented volume border, 3. Seeding, 4. Floodfill, 5.

Volume calculation and 6. Visualization. Steps 1-3 may be applied in a different order, and step 6 is optional.

Segmentation into Foreground and Background:

The method relies on exploiting the contrast enhanced (CE) MR images acquired after treating a fibroid using HIFU.

The distinction between the non-perfused volume (NPV) and remainder of the image can be done with for example thresholding the image, or by K-means clustering, or any other method that is capable of separating the NPV from the surroundings based on the difference in signal intensity.

The initial threshold could be calculated e.g. using the Otsu method, a fixed threshold or another algorithm. If necessary, the user could apply further manual adjustments to achieve the thresholding that accurately discriminates the non-perfused volume (NPV) from the surrounding tissue. Selecting the threshold could be global for all slices; however, slice-specific thresholding could be applicable if necessary. After determining the threshold, a stack of thresholded black-and-white image slices is compiled. Below is an example of a CE image thresholded using the Otsu method followed by manual adjustments by a user. In the example presented here, the user-defined threshold value is eventually used as the threshold for segmenting.

Figure 5:
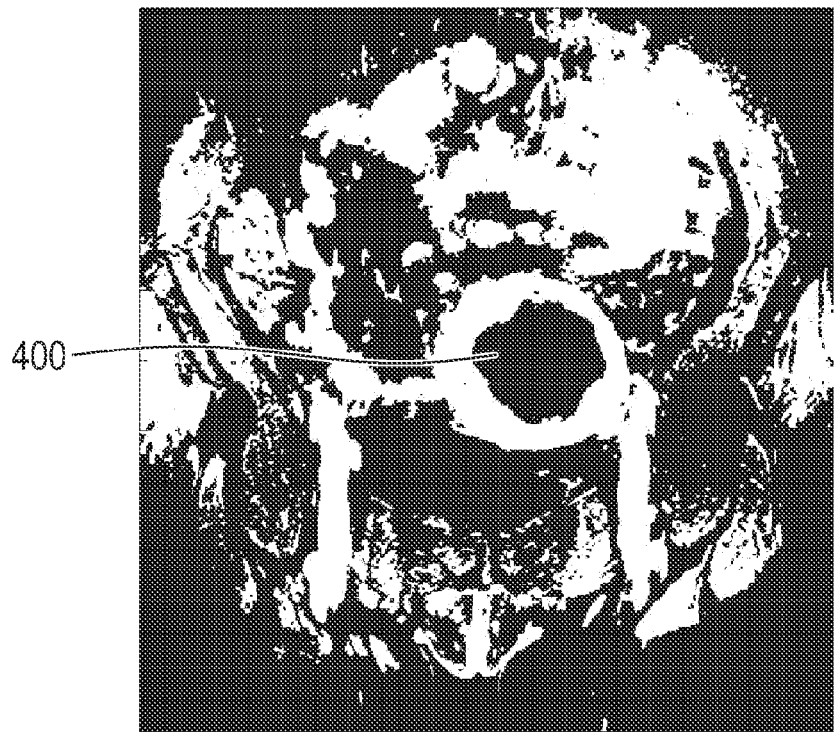
FIG. 5 shows an image generated by thresholding the image in FIG. 4.

FIG. 5 shows a thresholded black and white image which was generated using the image shown in FIG. 4. The treated volume is identified in FIG. 5 using the reference numerals 400 also.

Optional Adjustments of the NPV:

If after the initial segmentation, user observes that the dark NPV are within the fibroid is connected to dark area outside the fibroid e.g. due to bad SNR or NPV locating close to the fibroid edge, user could draw boundaries of the NPV or fibroid to avoid non-ablated non-perfused tissue from being confused with HIFU-ablated tissue. Instead of using manually drawn boundaries, the planned target volume (PTV) in the HIFU software or an easily modifiable 3D object defining the target tissue, could be used to limit the segmentation to a confined volume. This would be applied in order to avoid non-ablated tissue confused with ablated tissue. Another option is to generate an expected treated volume from known expected 3D dose shapes, which are adapted based on observed thermal doses in the different, e.g. coronal and sagittal, slices. Expected 3D dose shape is known for each treating event and total expected volume can be constructed by combining adapted shapes from all treating events. In the current example, no limiting boundaries, PTVs or 3D objects were required.

Automatic or semi-automatic approaches using the environment of the labeled voxels in the segmented image could alternatively be utilized to improve the probability of a voxel being correctly classified as either background or foreground. For example, if a voxel within the apparent NPV is just above the threshold chosen but all its neighbors are part of the NPV, then this voxel should probably actually be part of the NPV as well. The information of the classification of the neighboring voxels can be used to improve the segmentation by for example using Markov random fields (MRF) and an iterated conditional modes (ICM) algorithm. Delimiting the area/volume used in the ICM algorithm might be necessary to provide reliable results.

Figure 6:
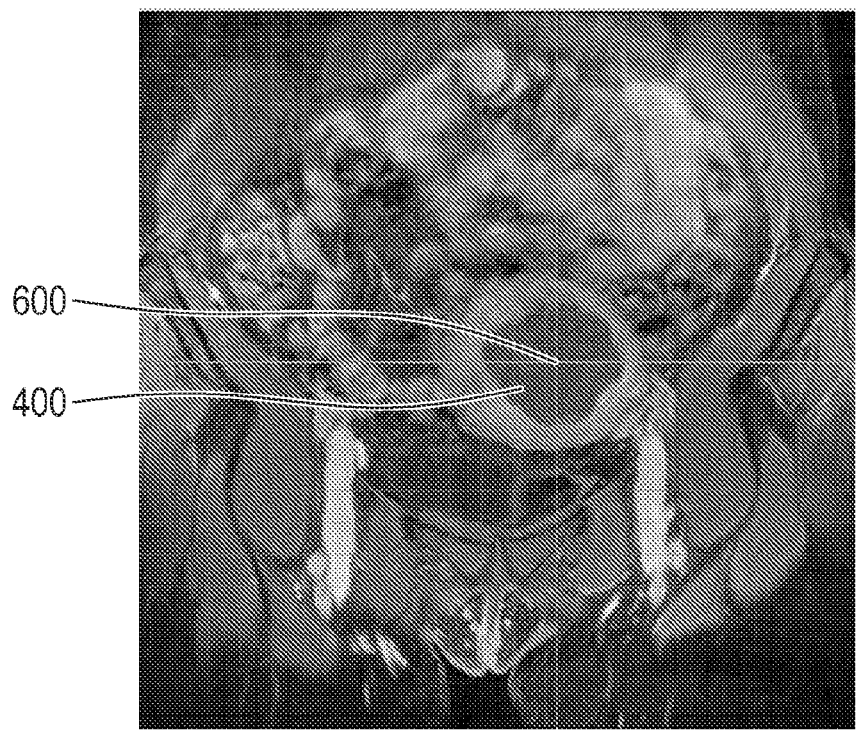
FIG. 6 shows the image of FIG. 4 with a image segmentation seed.

FIG. 6 shows the same Fig. as FIG. 4 except there are cross hairs which identify a point in the image which is used as an image segmentation seed 600. The image segmentation seed 600 is in the center of the treated volume 400 and could have readily been identified using the treatment plan.

Figure 7:
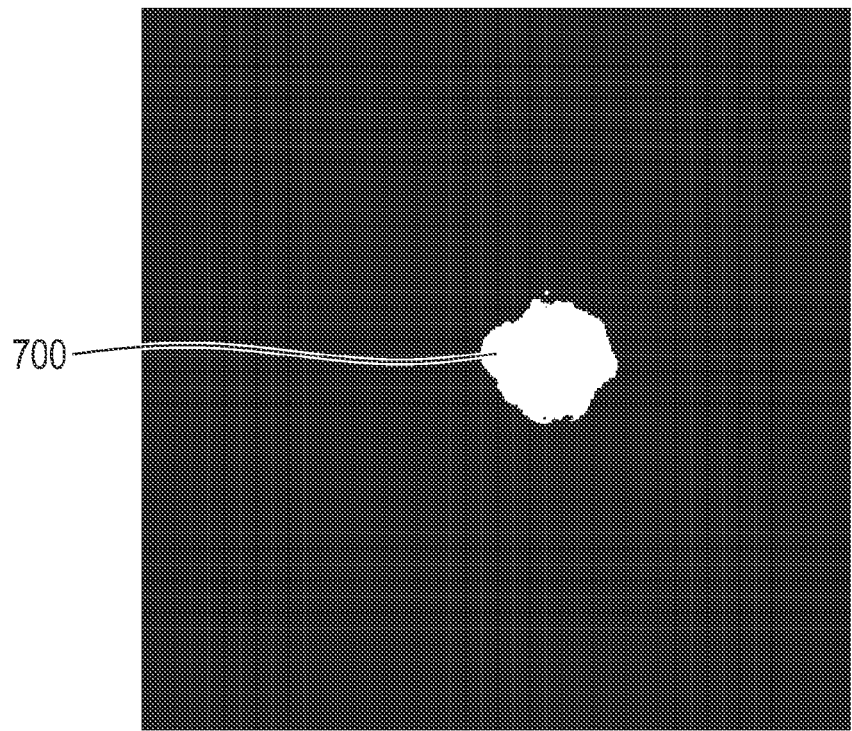
FIG. 7 shows a treated volume identified using FIGS. 5 and 6.

FIG. 7 shows the result of a floodfill 700 which has been performed on FIG. 5 using the image segmentation seed 600 identified in FIG. 6. It is clear that the floodfilled region 700 identified in FIG. 7 corresponds to the treated volume 400. The FIGS. 4-7 illustrate how an embodiment of the invention may be used to identify a region in a T1 enhanced magnetic resonance image after the subject has been administered with a T1 relaxation contrast agent.

Figure 8:
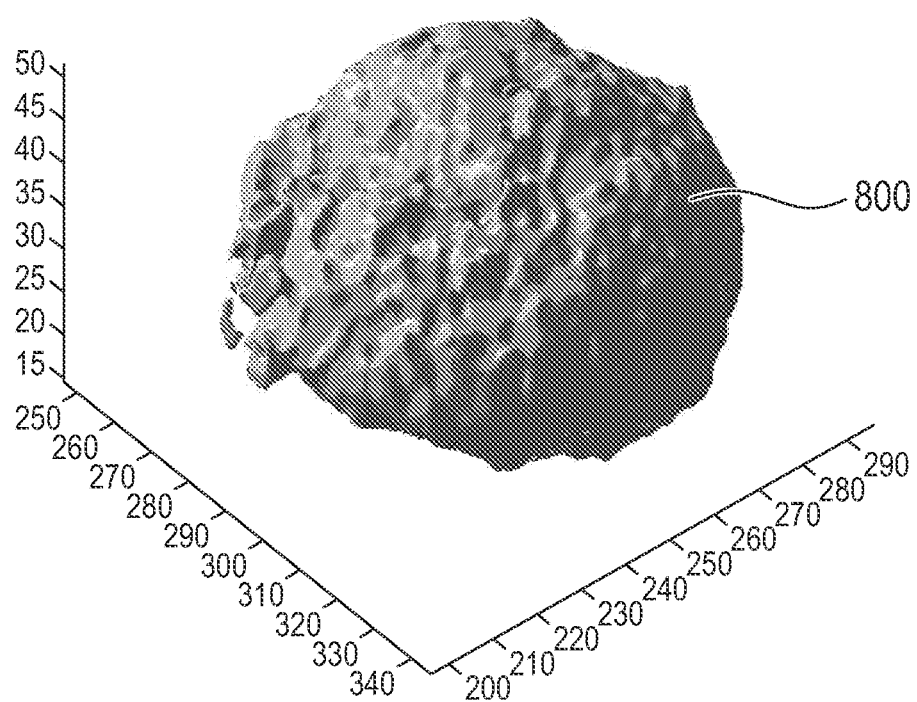
FIG. 8 shows a visualization of a non-perfused volume identified in multiple magnetic resonance images.

Floodfill:

The technique presented relies on 3D floodfill method starting from an automatically or manually defined seed voxel. The locations of sonicated cells could be used to determine the seed voxel(s). In the current example, one seed voxel was required and roughly placed manually at the spatial center of the NPV as indicated by the cross in the image below:

FIG. 8 shows a visualization of a non-perfused volume 800 that was identified in multiple magnetic resonance images. The magnetic resonance image of FIG. 4 was one of the images used to generate the non-perfused volume shown in FIG. 8. By identifying the non-perfused volume in multiple magnetic resonance images a 3D model may be constructed. Such a 3D model may be useful because it may be used for evaluating the quality of the segmentation of the non-perfused volume 800. It may also be useful for evaluating the effectiveness of the high-intensity focused ultrasound therapy. To this end, the three-dimensional object may also be made semi-transparent and overlaid on the anatomical images.

For instance, the three-dimensional object could be overlaid on the planning images or post-treatment images in the graphical user interface of the therapy guidance software. Since the images are inspected in two-dimensions, the cross-sections of the three-dimensional object would be overlaid in a semi-transparent color that would allow discriminating underlying anatomy in the grey-scale image while simultaneously visualizing the segmented volume.

Volume Calculation:

The volume of the NPV is calculated by multiplying the number of white pixels in the image stack representing the flood-fill region by the volume of one voxel.

Figure 9:
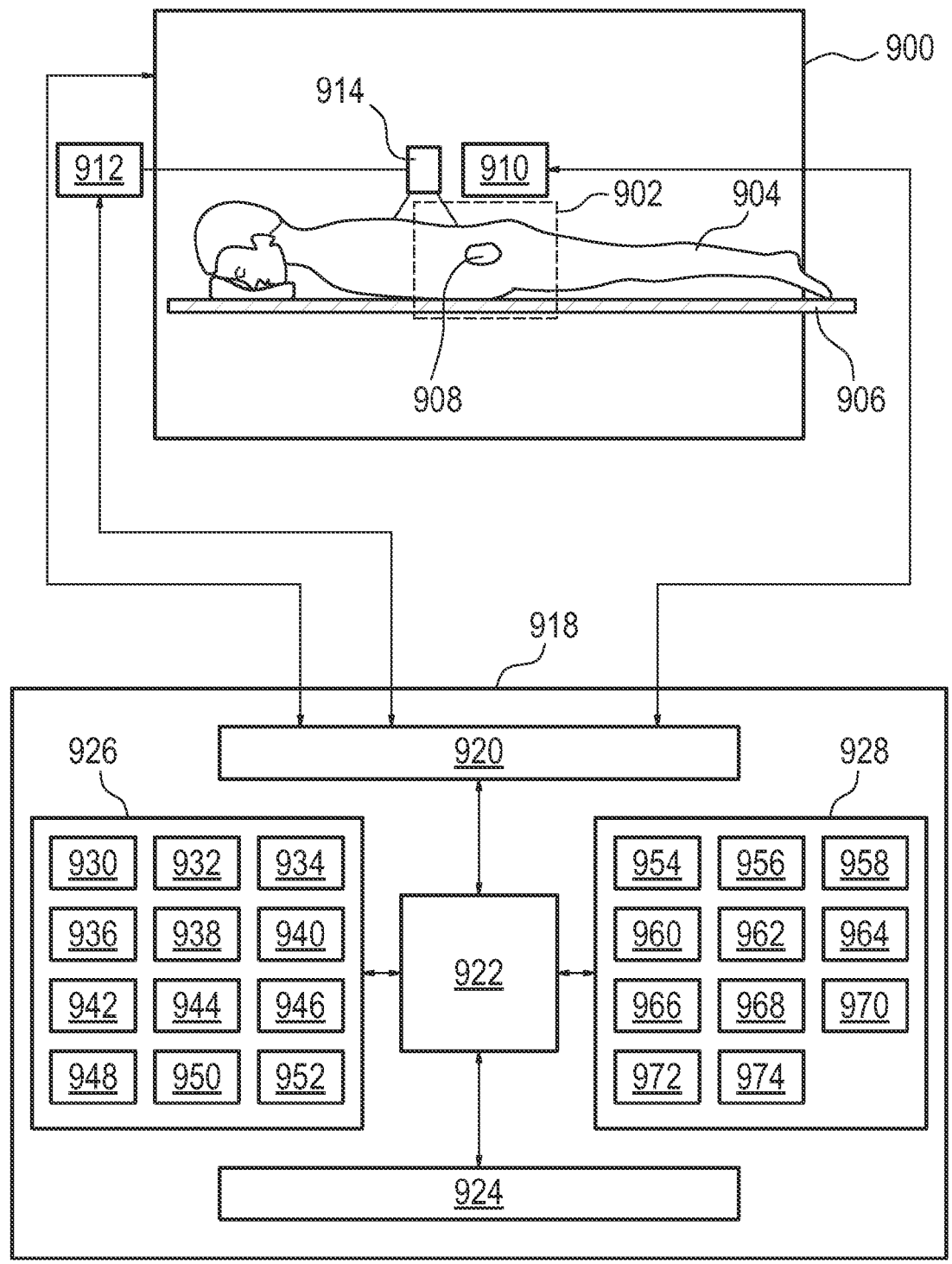
FIG. 9 shows a diagram which illustrates a medical imaging system according to an embodiment of the invention.

Visualization:

To observe the quality of the segmentation and the shape of the NPV, image stack representing the segmented NPV can be visualized e.g. as follows:

FIG. 9 shows an example of a medical imaging system 900 according to an embodiment of the invention. The medical imaging system 900 may be any medical imaging system which is adapted for acquiring medical image data from an imaging volume 902. For example the medical imaging system may be a magnetic resonance imaging system, a diagnostic ultrasound system and a computer tomography system. There is a subject 904 reposing on a subject support 906. The subject 904 is partially within the imaging volume 902. Within the subject 904 there is a target volume 908. Adjacent to the imaging zone 902 is a tissue treating system 910. The tissue treating system 910 is for treating the target volume 908. The tissue treating system may be any one of a variety of tissue treating systems. For example but not limited to the tissue treating system may be a high-intensity focused ultrasound system, a radio-frequency tissue treating system, a microwave applicator, and a laser.

Also shown in FIG. 9 is an optional electrographic ultrasound system 912. The electrographic ultrasound system 912 is connected to an electrographic ultrasound transducer 914. The electrographic ultrasound transducer 914 vibrates the subject 904 when energized by the electrographic ultrasound system 912. The vibrations in the subject 904 allow the imaging system 900 to identify different elastic properties within the imaging volume 902. For instance, if tissue has been treated or destroyed using the tissue treating system 910 the elastic properties of the tissue may change. The use of the electrographic ultrasound transducer 914 in system 912 may therefore allow the identification of a treated volume.

The medical imaging system 900, the tissue treating system 910 and the electrographic ultrasound system 912 are all shown as being connected to a hardware interface 920 of a computer system 918. The computer system 918 further comprises a processor 922 which is connected to the hardware interface 920. The hardware interface 920 allows the processor 922 to send and receive signals to the various components of the medical imaging system 900. The processor is also shown as being connected to a user interface 924, computer storage 926 and computer memory 928.

The computer storage 926 is shown as containing medical image data 932. The computer storage 926 is also shown as containing a medical image 932 which has been reconstructed from the medical image data 930. Also within the computer storage 926 is an image segmentation seed 934 which has been derived from a treatment plan 936 which is also stored in the storage 926. The computer storage 926 is further shown as containing a segmentation region 938 which may be used for limiting the segmentation in the medical image 932. The computer storage 926 is further shown as containing an expected treated volume 940 which may also be used for eliminating the segmentation of the medical image 932.

The computer storage 926 is further shown as containing a thermal dosage map 942. The thermal dosage map 942 may be used for generating an image segmentation seed 934. The computer storage 926 is further shown as containing planning medical image data 944 and a planning medical image 946 which has been reconstructed from the planning medical image data 944. The computer storage 926 is further shown as containing control signals 948 which may be used for controlling the tissue treating system 910. The computer storage 926 is further shown as containing a pre-contrast-agent medical image data 950 and a pre-contrast-agent medical image 952 which has been reconstructed from the pre-contrast-agent medical image data 950.

The computer memory 928 is shown as containing a medical imaging system control module 954 for controlling the function operation of the medical imaging system 900. The computer memory 928 is further shown as containing a tissue treating control module 956. The tissue treating control module contains computer-executable code for controlling the operation of the tissue treating system 910. The computer memory 928 is further shown as containing an electrographic ultrasound control module 958. The electrographic ultrasound control module 958 contains computer-executable code for controlling the function and operation of the electrographic ultrasound system 912. The computer memory is further shown as containing an image reconstruction module 960. The image reconstruction module 960 contains computer-executable code for reconstructing medical image data into medical images. For instance the image reconstruction module 960 may be used to transform the medical image data 930 into the medical image 932. Likewise this module may be used for transforming the planning medical image data 944 into the planning medical image 946. In a further example this module may be used for transforming the pre-contrast-agent medical image data 950 into the pre-contrast-agent medical image 952. The computer memory 928 is also shown as containing an image segmentation module 962. The image segmentation module 962 contains computer-executable code for segmenting medical images. Using an image segmentation seed 934, the image segmentation module 962 may be used to identify a treated volume. The computer memory is further shown as a treated volume identification module 964. Using the image segmentation output by the image segmentation module 962 the treated volume identification module 964 may be used to identify the treated volume.

The computer memory 928 is shown as containing an expected treated volume calculation module 968. Using the target volume 908 the expected treated volume calculation module 968 may be used to calculate an expected treated volume 940. The image segmentation module 962 may be used to define a segmentation region 938 which may be used for limiting the segmentation of the image. The computer memory is shown as further containing a thermal dosage map calculation module 970 which may be used to calculate the thermal dosage map 942. The thermal dosage map may in some embodiments be calculated purely using the treatment plan 936. In some embodiments the medical image 932 is also used.

The computer memory 928 is further shown as containing a control signal generation module 972. The module 972 is used for generating control signals 948 for controlling the tissue treating system 910 to heat the target volume 908. The memory 928 is finally shown as containing a time delay module 974. The time delay module 974 may be used for delaying acquisition of the medical image data 930 until after a predetermined amount of time has passed. For instance for a delay for when a contrast agent has been injected into the subject 904. This may be done automatically if an automatic system is used to inject the contrast agent into the subject 904. Alternatively the user interface 924 may have a button or control which is clicked by an operator which starts the timer.

Figure 10:
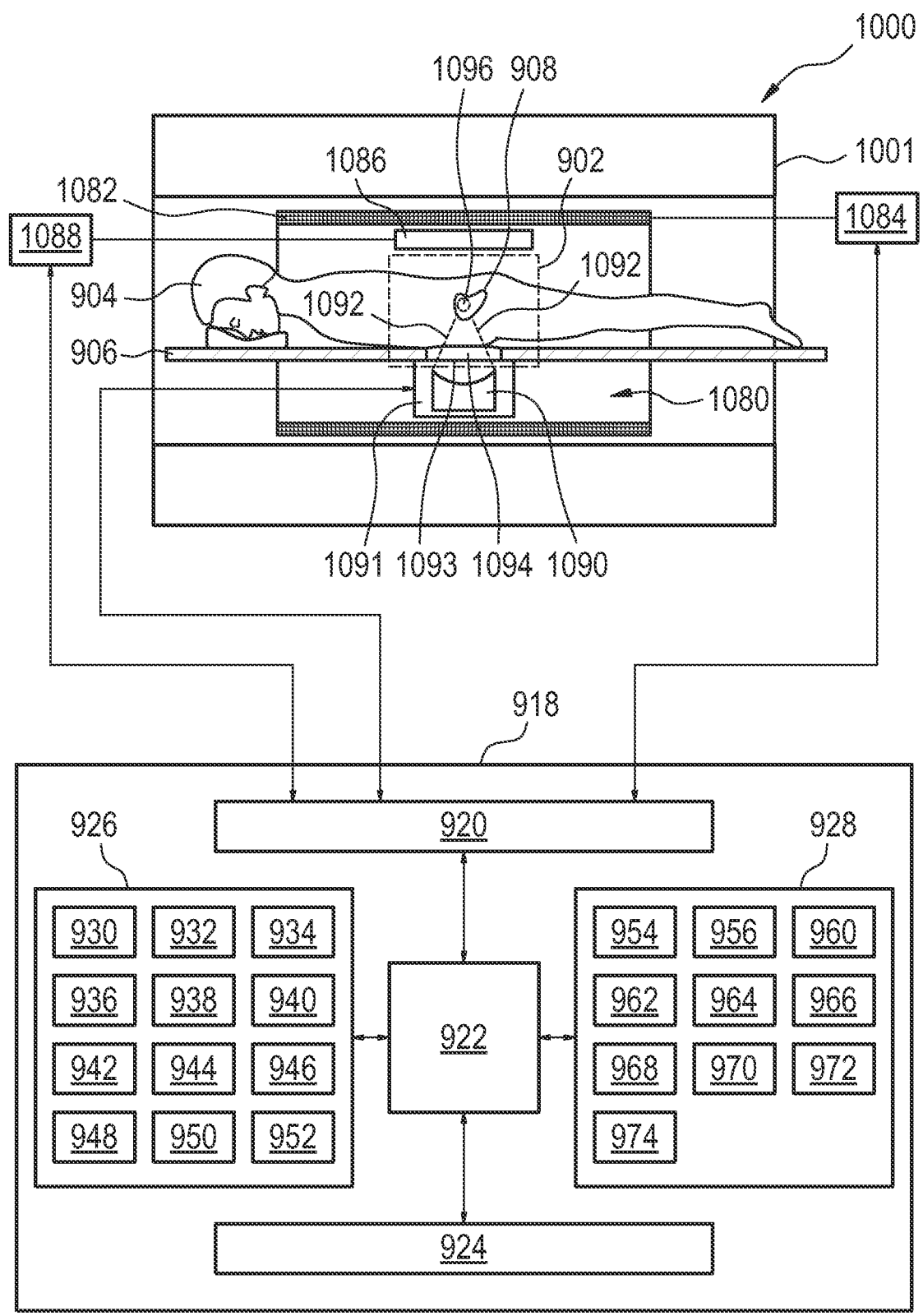
FIG. 10 shows a diagram which illustrates a medical imaging system according to a further embodiment of the invention.
Figure 11:
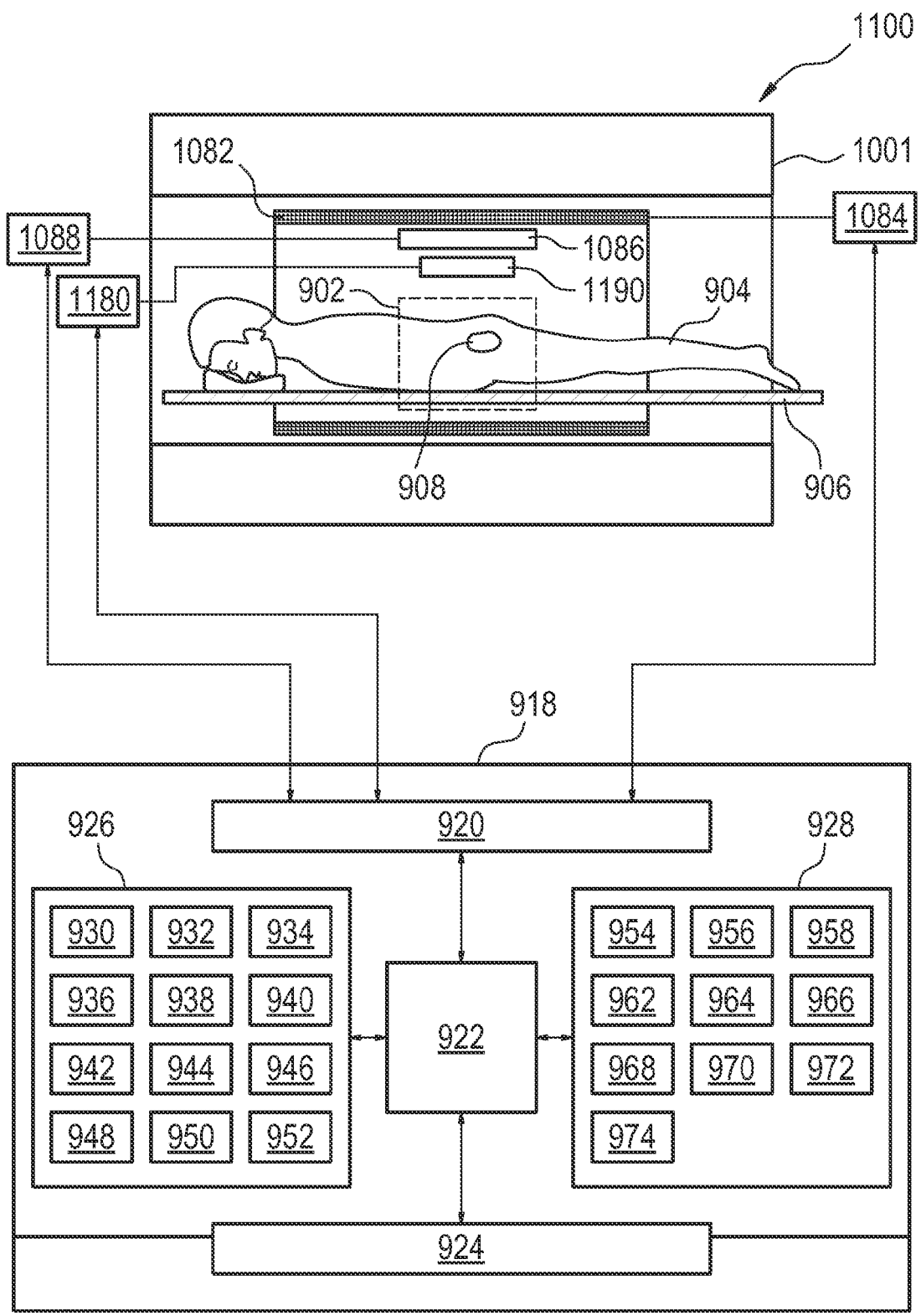
FIG. 11 shows a diagram which illustrates a medical imaging system according to a further embodiment of the invention.
Figure 12:
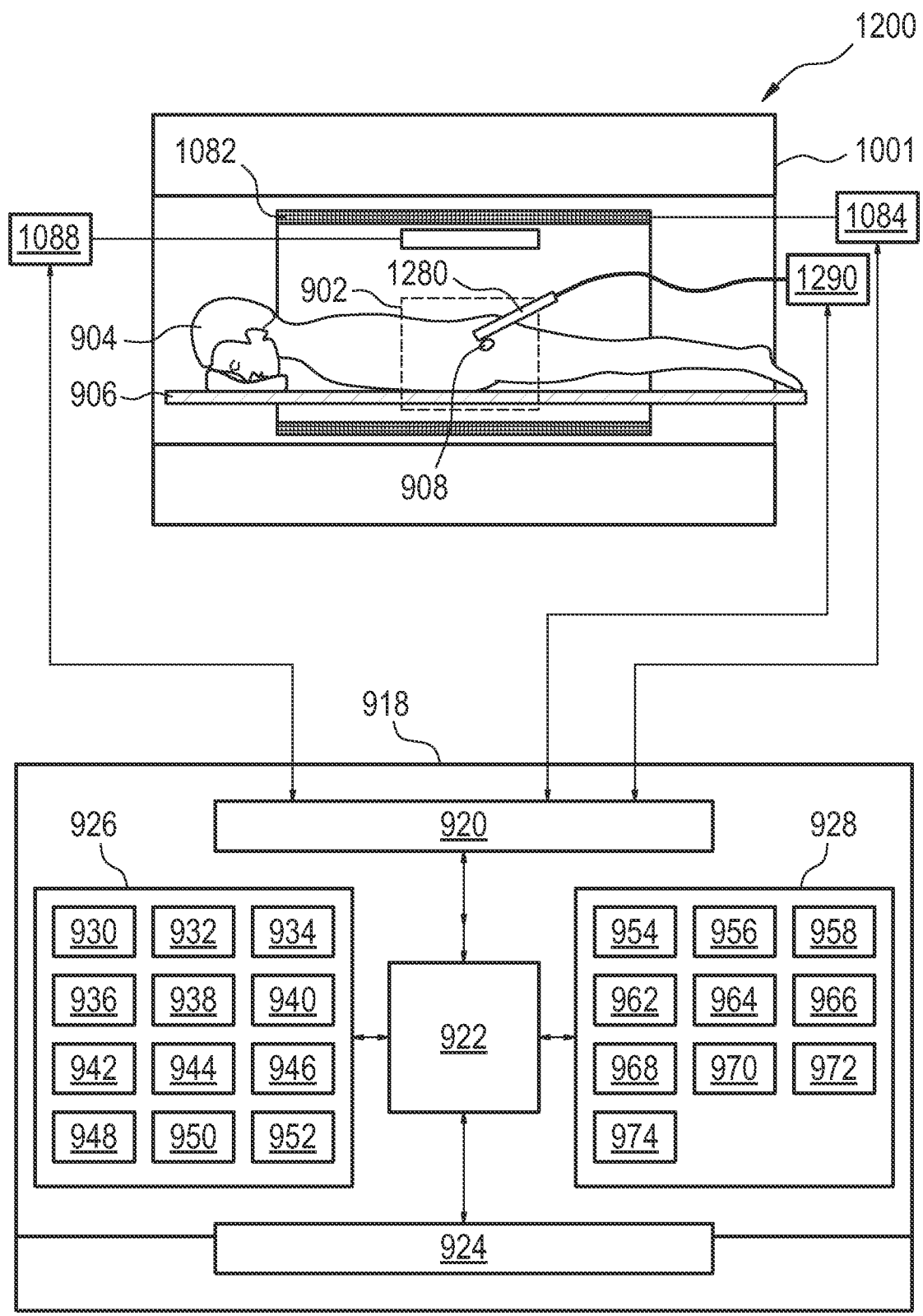
FIG. 12 shows a diagram which illustrates a medical imaging system according to a further embodiment of the invention.

The embodiment shown in FIG. 9 is a general embodiment and applies to many different types of medical imaging systems 900 and tissue treating systems 910. In the following FIGS. 10-12 the embodiment shown in FIG. 9 is made more specific to a magnetic resonance imaging system with various combinations of tissue treating systems 910. Reference numerals which perform an analogous function in FIGS. 10-12 are reused. As the function of an element may be analogous it is not necessarily discussed in FIGS. 10-12 if it has been discussed in detail in FIG. 9 already.

FIG. 10 shows an embodiment of a magnetic resonance imaging system 1000 combined with a high-intensity focused ultrasound system 1080. The magnetic resonance imaging system 1000 comprises a magnet 1001. In this example the magnet 1001 is a cylindrical bore conducting magnet. However other forms of magnets may also be used such as the so-called open magnet which resembles two Helmholtz coils. Inside the bore of the magnet there is a subject 904 on a subject support 906. The subject 904 is partially within the imaging volume 902 of the magnet 1001. The imaging zone 902 is a region of magnetic field which is uniform and strong enough for performing magnetic resonance imaging and acquiring magnetic resonance data.

Inside the bore of the magnet there is also a magnetic field gradient coil 1082. The magnetic field gradient coil 1082 is understood to be three different magnetic field gradient coil systems for spatially encoding the magnetic field within the imaging zone 902. The magnetic field gradient coil 1082 is connected to a magnetic field gradient coil power supply 1084 which supplies current to the coil 1082. Adjacent to the imaging zone 902 is a radio-frequency coil 1086. The radio-frequency coil is connected to a transceiver 1088. It is understood that both the radio-frequency coil 1086 and the radio-frequency transceiver 1088 may be replaced with separate transmit and receive radio-frequency coils and a separate transmitter and receiver.

The tissue treating system in this embodiment is a high-intensity focused ultrasound system 1080. The high-intensity focused ultrasound system 1080 comprises an ultrasound transducer 1090 which is located within a fluid filled volume 1091. The fluid filled volume 1091 conducts ultrasound from the ultrasound transducer 1090 along the path 1092. The ultrasound goes through an ultrasound window 1093. An ultrasound window as used herein is a window which transmits ultrasonic energy. Between the subject 904 and the ultrasound window 1093 is a gel pad 1094 for conducting the ultrasound. Finally the ultrasound is focused into a sonication volume 1096. The sonication volume 1096 may then be moved in order to heat the entire target volume 908. The radio-frequency transceiver 1088, the high-intensity focused ultrasound system 1080, and the magnetic field gradient coil power supply 1084 are all shown as being connected to the hardware interface 920. The computer system 918 and the contents of the computer storage 926 and memory 928 are analogous to that as shown in FIG. 9.

FIG. 11 shows a further embodiment of a magnetic resonance imaging system 1100 which uses a radio-frequency heating system for heating the target volume 908. The magnetic resonance imaging system shown in FIG. 11 is analogous to that shown in FIG. 10. Instead of the high-intensity focused ultrasound system there is a radio-frequency power supply 1180 connected to a radio-frequency heating coil 1190. The radio-frequency heating coil 1190 is used to heat the target volume 908 when energized by the radio-frequency power supply 1180.

In this embodiment the radio-frequency transceiver 1088, the magnetic field gradient coil power supply 1084, and the radio-frequency power supply 1180 are connected to the hardware interface 920 of computer system 918. The computer system and the contents of the computer memory 928 and computer storage 926 are analogous to that of FIGS. 9 and 10.

The radio-frequency coil 1190 may be a multi-element coil. The radio-frequency power supply 1180 may adjust the phase and/or amplitude of radio-frequency power supplied to each of the elements of the multi-element coil. By controlling the phase and/or amplitude of the radio-frequency power to each of the elements, heating caused by the radio-frequency heating coil may be concentrated in the target volume 908. This is due to the constructive and/or destructive effects of adding the radio-frequency radiation emitted by the different coil elements of the multi-element coil.

FIG. 12 shows a further embodiment of a magnetic resonance imaging system 1200 according to a further embodiment of the invention. The magnetic resonance imaging system shown in FIG. 12 is analogous to that that is shown in FIGS. 10 and 11. Instead of using a high-intensity focused ultrasound system or a radio-frequency heating system a local applicator 1280 is used to heat the target volume 908. The local applicator 1280 may be for example interpreted as, but not limited to: a laser system, a microwave applicator, a radio-frequency ablator, and a cryo-ablator. A cryo-ablator as used herein is a tissue ablation system that ablates tissue by cooling it. The local applicator 1280 is connected to a power supply 1290 which supplies the local applicator 1280 with either heating or cooling power. For a laser system, the power supply 1290 supplies the applicator with laser light or energy. For a microwave applicator, the power supply 1290 supplies the applicator with microwave energy. For a radio-frequency ablator, the power supply 1290 supplies the applicator with radio-frequency energy. For a cryo-ablator, the power supply 1290 supplies the applicator with cooling power. The cooling power may be in the form of electrical energy in the case of a Peltier cooling system or it may supply a cooled gas or liquid to the applicator. For instance liquid nitrogen could be supplied to the applicator 1280 by the power supply 1290.

In this embodiment the magnetic field gradient coil power supply, the radio-frequency transceiver 1088, and the power supply 1290 are connected to the hardware interface 920 of the computer system 918. The computer system 918 and the contents of its storage 926 and memory 928 are analogous to that that is shown in FIGS. 9 through 11.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

LIST OF REFERENCE NUMERALS

400 treated volume
600 image segmentation seed
700 floodfill
800 non perfused volume
900 medical imaging system
902 imaging volume
904 subject
906 subject support
908 target volume
910 tissue treating system
912 electrographic ultrasound system
914 electrographic ultrasound transducer
918 computer system
920 hardware interface
922 processor
924 user interface
926 storage
928 memory
930 medical image data
932 medical image
934 image segmentation seed
936 treatment plan
938 segmentation region
940 expected treated volume
942 thermal dosage map
944 planning medical image data
946 planning medical image
948 control signals
950 pre-contrast-agent medical image data
952 pre-contrast-agent medical image
954 medical imaging system control module
956 tissue treating control module
958 electrographic ultrasound control module 960 image reconstruction module
962 image segmentation module
964 treated volume identification module
966 segmentation region determination module
968 expected treated volume calculation module
970 thermal dosage map calculation module
972 control signal generation module
974 time delay module
1000 magnetic resonance imaging system
1001 magnet
1080 high intensity focused ultrasound system
1082 magnetic field gradient coil
1084 magnetic field gradient coil power supply
1086 radio-frequency coil
1088 radio-frequency transceiver
1090 high intensity focused ultrasound transducer
1091 fluid filled volume
1092 path of ultrasound
1093 ultrasound window
1094 gel pad
1096 sonication volume
1100 magnetic resonance imaging system
1180 radio-frequency power supply
1190 radio-frequency heating coil
1200 magnetic resonance imaging system
1280 local applicator
1290 power supply

The invention claimed is:

1. A medical imaging system for acquiring medical image data from an imaging volume, the medical imaging system comprising:
    a tissue treating system for treating a target volume of a subject;
    a computer system comprising a processor, wherein the computer system is adapted for controlling the medical imaging system; and
    a memory containing machine readable instructions for execution by the processor, wherein execution of the instructions cause the processor to:
        acquire medical image data by controlling the medical imaging system;
        reconstruct a medical image using the medical image data;
        receive an image segmentation seed derived from a treatment plan, wherein the treatment plan is descriptive of the target volume, and
        identify a treated volume in the medical image by: segmenting the medical image in accordance with the image segmentation seed; thresholding the medical image; floodfilling the thresholded medical image in accordance with the image segmentation seed; and identifying the treated volume in accordance with the floodfill in the thresholded medical image.

2. The medical imaging system of claim 1, wherein the segmentation of the medical image is limited to a segmentation region, and wherein the segmentation region is determined in accordance with the target volume.

3. The medical imaging system of claim 1, wherein the instructions further cause the processor to perform the step of calculating an expected treated volume in accordance with the treatment plan, wherein the segmentation of the medical image is limited to the expected treated volume.

4. The medical imaging system of claim 1, wherein the instructions further cause the processor to derive the image segmentation seed from the treatment plan.

5. The medical imaging system of claim 4, instructions further cause the processor to calculate a thermal dosage map in accordance with the treatment plan, wherein the image segmentation seed is derived by selecting at least one region with a thermal dose above a predetermined threshold from the thermal dosage map.

6. The medical imaging system of claim 4, wherein the image segmentation seed is selected from at least one region in the target volume by treating points specified in the treatment plan.

7. The medical imaging system of claim 1, wherein the instructions further cause the processor to:
    acquire planning medical imaging data using the medical imaging system;
    reconstruct a planning medical image using the planning medical image data;
    generate control signals for controlling the tissue treating system in accordance with the planning medical image and the treatment plan; and
    send the control signals to the tissue treating system which result in the tissue treating system treating the target volume.

8. The medical imaging system of claim 1, wherein the tissue treating system is any one of the following, a high intensity focused ultrasound system, a radio-frequency tissue treating system, microwave applicator, a cryo-ablator, and a laser.

9. The medical imaging system of claim 1, wherein the medical imaging system further comprises an electrographic ultrasound system, wherein the instructions further cause the processor to activate the electrographic ultrasound system when acquiring the medical image data, wherein the medical image is an electrographic medical image.

10. The medical imaging system of claim 1, wherein the medical imaging system is a magnetic resonance imaging system, and wherein the instructions cause the processor to acquire the medical imaging data a predetermined time after the subject is injected with a magnetic resonance contrast agent.

11. The medical imaging system of claim 1, wherein the instructions further cause the processor to acquire pre-contrast-agent medical image data, wherein the instructions further cause the processor to reconstruct a pre-contrast-agent medical image, and wherein the instruction cause the processor to identify the treated volume in the magnetic resonance image in accordance with the image segmentation seed and the pre-contrast-agent medical image.

12. The medical imaging system of claim 1, wherein the medical imaging system is any one of the following: an ultrasound imaging system, a computed tomography system, and a magnetic resonance imaging system.

13. A computer-implemented method of identifying a treated volume in a medical image, the method comprising:
    receiving medical imaging data;
    reconstructing the medical image using the medical image data;
    receiving an image segmentation seed derived from a treatment plan, wherein the treatment plan is descriptive of a target volume, and
    identifying a treated volume in the medical image by: segmenting the magnetic resonance image in accordance with the image segmentation seed; thresholding the medical image; floodfilling the thresholded medical image in accordance with the image segmentation seed; and identifying the treated volume in accordance with the floodfill in the thresholded medical image.

14. A non-transitory computer-readable medium comprising machine executable instructions for execution by a processor, wherein execution of the instructions causes the processor to:
- receive medical imaging data;
- reconstruct a medical image using the medical image data;
- receive an image segmentation seed derived from a treatment plan, wherein the treatment plan is descriptive of a target volume, and
- identify a treated volume in the medical image by: segmenting the medical image in accordance with the image segmentation seed; thresholding the medical image; floodfilling the thresholded medical image in accordance with the image segmentation seed; and identifying the treated volume in accordance with the floodfill in the thresholded medical image.

15. A medical imaging system for acquiring medical image data from an imaging volume, the medical imaging system comprising:
- a tissue treating system for treating a target volume of a subject;
- a computer system comprising a processor, wherein the computer system is adapted for controlling the medical imaging system; and
- a memory containing machine readable instructions for execution by the processor, wherein execution of the instructions cause the processor to:
  - acquire medical image data by controlling the medical imaging system;
  - reconstruct a medical image using the medical image data;
  - receive an image segmentation seed derived from a treatment plan, wherein the treatment plan is descriptive of the target volume, and
  - identify a treated volume in the medical image by: segmenting the medical image in accordance with the image segmentation seed.

16. The medical imaging system of claim 15, wherein the segmentation of the medical image is limited to a segmentation region, and wherein the segmentation region is determined in accordance with the target volume.

17. The medical imaging system of claim 15, wherein the instructions further cause the processor to perform the step of calculating an expected treated volume in accordance with the treatment plan, wherein the segmentation of the medical image is limited to the expected treated volume.

18. The medical imaging system of claim 15, wherein the instructions further cause the processor to derive the image segmentation seed from the treatment plan.

19. The medical imaging system of claim 18, instructions further cause the processor to calculate a thermal dosage map in accordance with the treatment plan, wherein the image segmentation seed is derived by selecting at least one region with a thermal dose above a predetermined threshold from the thermal dosage map.

20. The medical imaging system of claim 18, wherein the image segmentation seed is selected from at least one region in the target volume by treating points specified in the treatment plan.

21. The medical imaging system of claim 15, wherein the instructions further cause the processor to:
- acquire planning medical imaging data using the medical imaging system;
- reconstruct a planning medical image using the planning medical image data;
- generate control signals for controlling the tissue treating system in accordance with the planning medical image and the treatment plan; and
- send the control signals to the tissue treating system which result in the tissue treating system treating the target volume.

* * * * *